(12) United States Patent
Kawamoto

(10) Patent No.: US 12,212,878 B2
(45) Date of Patent: Jan. 28, 2025

(54) IMAGING APPARATUS AND IMAGING SYSTEM

(71) Applicant: Panasonic Intellectual Property Management Co., Ltd., Osaka (JP)

(72) Inventor: Shigeharu Kawamoto, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 248 days.

(21) Appl. No.: 17/833,536

(22) Filed: Jun. 6, 2022

(65) Prior Publication Data

US 2023/0007190 A1    Jan. 5, 2023

(30) Foreign Application Priority Data

Jul. 2, 2021  (JP) ................................. 2021-110674

(51) Int. Cl.
| | |
|---|---|
| *H04N 5/262* | (2006.01) |
| *B60R 1/12* | (2006.01) |
| *B60R 1/22* | (2022.01) |
| *H04N 7/18* | (2006.01) |
| *H04N 23/698* | (2023.01) |

(52) U.S. Cl.
CPC ........... *H04N 5/2628* (2013.01); *H04N 7/183* (2013.01); *H04N 23/698* (2023.01); *B60R 1/12* (2013.01); *B60R 2001/1215* (2013.01); *B60R 1/22* (2022.01)

(58) Field of Classification Search
CPC .... H04N 5/2628; H04N 7/183; H04N 23/698; H04N 23/55; B60R 1/12; B60R 1/22; B60R 2001/1215; B60R 2300/8046; B60R 1/25; B60R 1/26; B60R 1/28; B60R 2300/20; B60R 2300/70; G03B 30/00; G03B 37/00

See application file for complete search history.

(56) References Cited

U.S. PATENT DOCUMENTS

| | | | |
|---|---|---|---|
| 6,259,359 B1 | 7/2001 | Fujinami et al. | |
| 10,447,948 B2 | 10/2019 | Aihara et al. | |
| 10,917,610 B2 * | 2/2021 | Aihara | ..................... H04N 7/18 |

(Continued)

FOREIGN PATENT DOCUMENTS

| | | |
|---|---|---|
| CN | 109644251 A | 4/2019 |
| CN | 110178369 A | 8/2019 |

(Continued)

OTHER PUBLICATIONS

Japanese Office Action, mailed Nov. 19, 2024, for Japanese Patent Application No. 2021-110674. (6 pages) (with English translation).

(Continued)

*Primary Examiner* — Farzana Hossain
(74) *Attorney, Agent, or Firm* — Seed IP Law Group LLP

(57) ABSTRACT

An imaging apparatus is disclosed. The imaging apparatus includes an imaging element and an optical system. On the imaging element, a plurality of pixels is arranged in a two-dimensional manner. The imaging element generates image data on the basis of output of the plurality of pixels. The optical system forms, on an imaging plane of the imaging element, an image of light from a field at a magnification factor varying with a field angle. An optical axis of the optical system on the imaging plane is positioned away from a center of the imaging plane.

10 Claims, 14 Drawing Sheets

(56) References Cited

U.S. PATENT DOCUMENTS

| | | | | |
|---|---|---|---|---|
| 11,310,461 B2* | 4/2022 | Aihara | ................... | G02B 13/00 |
| 2018/0332243 A1* | 11/2018 | Aihara | ................. | H04N 23/698 |
| 2020/0059598 A1 | 2/2020 | Breuer et al. | | |

FOREIGN PATENT DOCUMENTS

| | | | |
|---|---|---|---|
| JP | 2011193485 A | | 9/2011 |
| JP | 6349558 B1 | | 7/2018 |
| WO | WO 2015122117 A1 | | 8/2015 |
| WO | WO 2018207373 A1 | | 11/2018 |
| WO | WO 2020153317 A1 | | 7/2020 |

OTHER PUBLICATIONS

Notification of First Office Action, dated Dec. 2, 2024, for Chinese Patent Application No. 202210760684.X. (16 pages) (With English Translation).

* cited by examiner

IMAGING APPARATUS AND IMAGING SYSTEM

CROSS-REFERENCE TO RELATED APPLICATIONS

This application is based upon and claims the benefit of priority from Japanese Patent Application No. 2021-110674, filed on Jul. 2, 2021, the entire contents of which are incorporated herein by reference.

FIELD

The present disclosure relates generally to an imaging apparatus and an imaging system.

BACKGROUND

There has been a conventionally known moving body, such as an automobile, which is equipped with an in-vehicle display to display an image indicating a rear status (for example, Japanese Patent No. 6349558 B1). The in-vehicle display is sometimes used as, for example, a rear-view monitor for assisting the driver when parking the vehicle. In addition, there is a case where this type of moving body such as a vehicle is equipped with an electronically driven rear-view mirror (hereinafter, referred to as an electronic rear-view mirror) having a function of displaying a captured rear-view image. Under such circumstances, in view of cost reduction and the like, there has been a demand for sharing an imaging apparatus between the use for a rear-view monitor and the use for an electronic rear-view mirror.

However, an imaging apparatus for an electronic rear-view mirror and an imaging apparatus for a rear-view monitor are different in field angles. Specifically, an image capturing range of the imaging apparatus for an electronic rear-view mirror is located in a peripheral portion of an image capturing range of the imaging apparatus for a rear-view monitor, that is, located in a region deviating from the optical axis. Additionally, in some cases regarding the optical characteristics of the optical system to be used, the angular intervals of the image forming positions between the optical axis and an edge of the field angle is uniform. Therefore, when one imaging apparatus is shared between the rear-view monitor and the electronic rear-view mirror, the resolution of an image for the electronic rear-view mirror may be degraded. On the other hand, in order to reliably obtain good resolution of the image for the electronic rear-view mirror, it has been necessary to increase the size of the imaging plane, that is, the size of the image sensor.

SUMMARY

An imaging apparatus according to the present disclosure includes an imaging element and an optical system. On the imaging element, a plurality of pixels is arranged in a two-dimensional manner. The imaging element is configured to generate image data on the basis of output of the plurality of pixels. The optical system is configured to form, on an imaging plane of the imaging element, an image of light from a field at a magnification factor varying with a field angle. An optical axis of the optical system on the imaging plane is positioned away from a center of the imaging plane.

DETAILED DESCRIPTION

Figure 1:
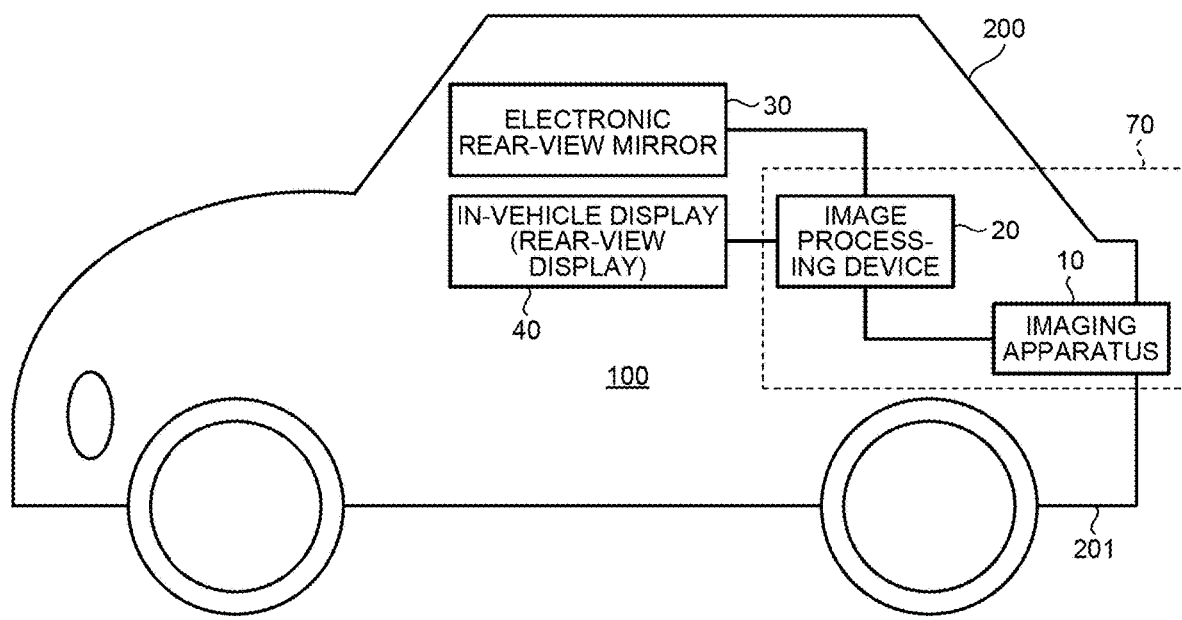
FIG. 1 is a diagram illustrating an example of a configuration of an automobile to which a display system according to an embodiment is applied.

Hereinafter, embodiments of an imaging apparatus, an imaging system, and a display system according to the present disclosure will be described with reference to the drawings.

In the description of the present disclosure, components having the same or substantially the same functions as those described above with respect to the already described drawings are denoted by the same reference numerals, and the description thereof may be appropriately omitted. In addition, even in the case of representing the same or substantially the same portion, representation of the dimensions and ratios may be different from each other depending on the drawings. Furthermore, for example, from the viewpoint of ensuring visibility of the drawings, there may be a case, in the description of each drawing, where only main components are denoted by reference numerals, and even components having the same or substantially the same functions as those described above in the previous drawings are not denoted by reference numerals.

Note that the imaging apparatus, the imaging system, and the display system according to the present disclosure can be appropriately used for various types of moving bodies. The moving body may be various types of vehicles such as a bicycle, a motorcycle, an automobile, and a train, for example. In addition, the moving body may be a moving body such as a ship and an aircraft. In addition, the moving body may be a manned moving body or may be an unmanned moving body. Furthermore, the movement of the moving body may be controlled by the user, or may be autonomously controlled according to a set route, a surrounding situation, and the like.

FIG. 1 is a diagram illustrating an example of a configuration of an automobile 200 to which a display system 100 according to the embodiment is applied. As illustrated in FIG. 1, the display system 100 is installed in the automobile 200, for example. Here, the automobile 200 is an example of a moving body.

The display system 100 includes an electronic rear-view mirror 30, an in-vehicle display 40, and an imaging system 70. The imaging system 70 includes an imaging apparatus 10 and an image processing device 20.

The imaging apparatus 10 is an in-vehicle camera that images a subject and generates image data. The imaging apparatus 10 is mounted on the automobile 200 so as to perform imaging in a first imaging direction facing the rear of the vehicle. The imaging apparatus 10 is disposed at, for example, a rear position 201 of the automobile 200. Here, the rear position 201 of the automobile 200 is a position above the license plate, for example, but is not limited thereto. The imaging apparatus 10 may be disposed on a rear window, a rear bumper, or the like.

Figure 2:
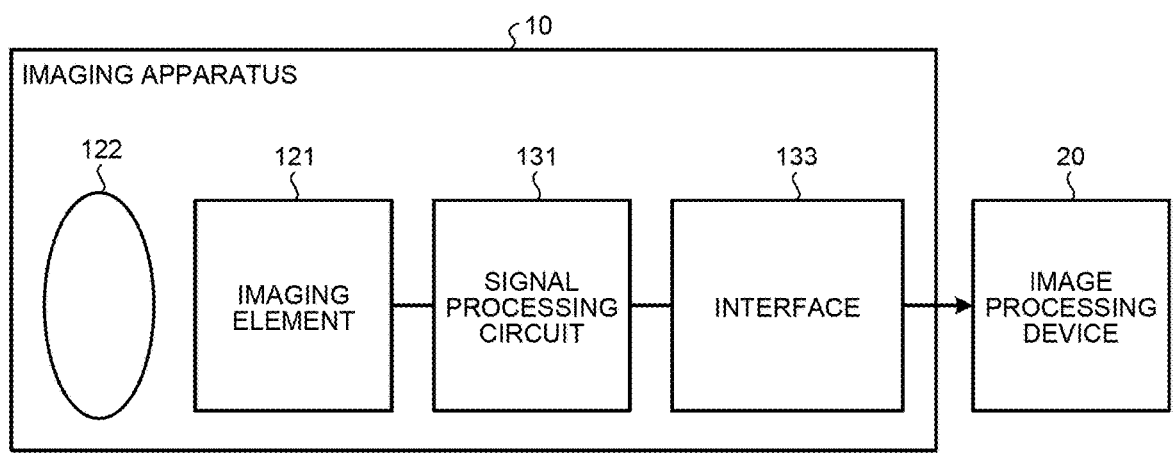
FIG. 2 is a diagram illustrating an example of a configuration of an imaging apparatus in FIG. 1.

FIG. 2 is a diagram illustrating an example of a configuration of the imaging apparatus 10 in FIG. 1. As illustrated in FIG. 2, the imaging apparatus 10 includes an imaging element 121, an optical system 122, a signal processing circuit 131, and an interface 133.

The imaging element 121 captures an image formed on the imaging plane via the optical system 122 and generates image data. On the imaging plane of the imaging element 121, a plurality of pixels is arranged in a two-dimensional manner, more specifically, in a matrix. The imaging element 121 can be implemented by using an image sensor, such as, for example, a charge coupled device (CCD) or a complementary metal oxide semiconductor (CMOS) image sensor.

The optical system 122 is an optical unit that forms an image on the imaging plane of the imaging element 121. The optical system 122 includes a lens aperture, a filter, and the like. The optical system 122 may also include a mirror or a prism that reflects light. In the optical system 122, a magnification factor of an image to be formed varies with a field angle, for example.

Figure 3:
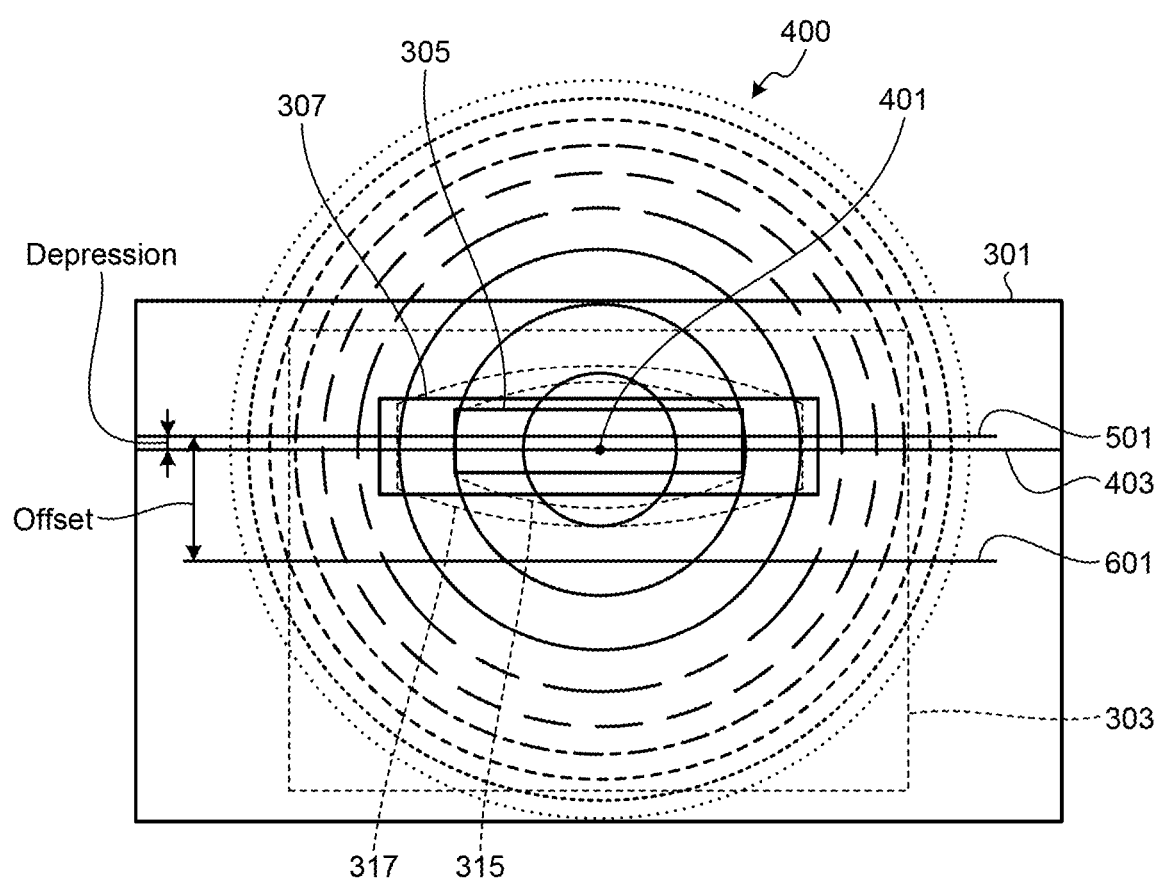
FIG. 3 is a schematic diagram illustrating an example of a relationship between relative positions of an imaging plane of an imaging element and an image forming position on the imaging plane of an optical system in the imaging apparatus in FIG. 1.
Figure 4:
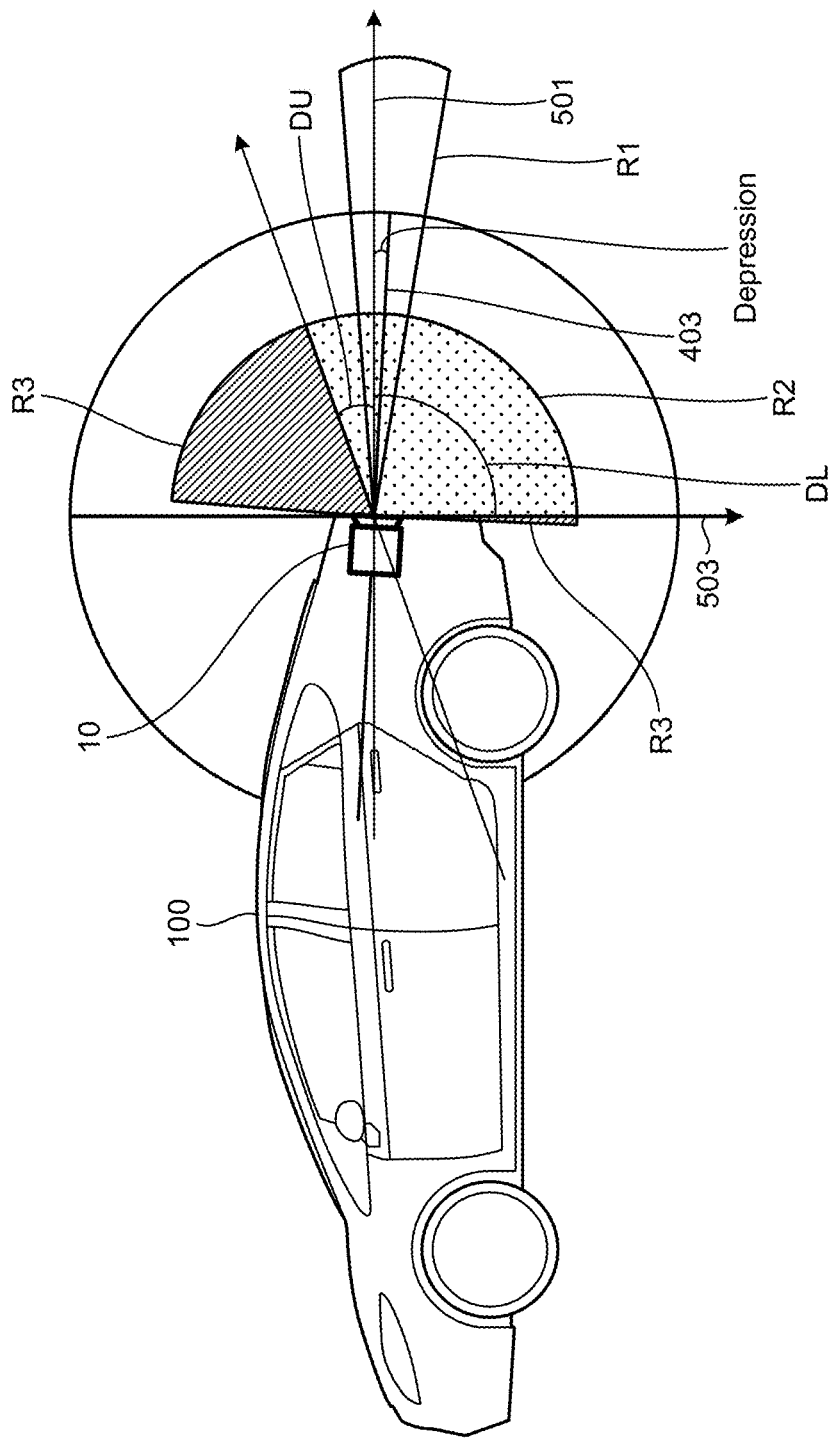
FIG. 4 is a diagram illustrating an example of a field angle in a vertical direction in the imaging apparatus in FIG. 1.

FIG. 3 is a schematic diagram illustrating an example of a relationship between relative positions of an imaging plane 301 of the imaging element 121 and an image forming position on the imaging plane 301 of the optical system 122 in the imaging apparatus 10 in FIG. 1. FIG. 4 is a diagram illustrating an example of a field angle in a vertical direction in the imaging apparatus 10 in FIG. 1. FIG. 4 illustrates a visual field R1 corresponding to a field angle for the electronic rear-view mirror 30, a visual field R2 corresponding to a field angle for the in-vehicle display 40, and a region R3 outside an image shooting range. Moreover, FIG. 3 illustrates an incident position of light from a horizontal direction 501 in a case where the imaging apparatus 10 is mounted on the automobile 200 as illustrated in FIG. 4. Here, although each side of the imaging plane 301 is assumed to be arranged in the horizontal direction 501 or a vertical direction 503 for the sake of simplicity of description, arrangement method is not limited thereto. The field angle for the in-vehicle display 40 is an example of the first field angle. Moreover, the field angle for the electronic rear-view mirror 30 is an example of a second field angle. As illustrated in FIG. 3, the imaging apparatus 10 according to the present embodiment is configured such that an optical axis 401 of the optical system 122 on the imaging plane 301 is positioned away from a center 601 of the imaging element 121. The position of the optical axis 401 of the optical system 122 on the imaging plane 301 is preferably located in the vicinity of a region 315 of the imaging element 121, which is a region to be used for generating image data for the electronic rear-view mirror 30. More preferably, the position of the optical axis 401 of the optical system 122 on the imaging plane 301 is located within the region 315. The imaging plane 301 is an example of a first region. The region 315 is an example of a second region.

More specifically, on the imaging plane 301, the position of the optical axis 401 of the optical system 122 is away from a position of the center 601 of the imaging element 121 by a predetermined angle. The predetermined angle corresponds to a difference between an offset (offset between the imaging element 121 and the optical system 122) and a depression angle according to a mounting angle of the imaging apparatus 10. In other words, the predetermined angle is indicated by a sum of an offset (offset between the imaging element 121 and the optical system 122) and an elevation angle according to the mounting angle of the imaging apparatus 10.

Note that, in the example illustrated in FIG. 3, the offset is a sum of: an interval between the center 601 of the imaging element 121 and the image forming position of light in an optical axis direction 403, and an interval corresponding to a depression angle between the image forming position of light from the optical axis direction 403 and the image forming position of light in the horizontal direction 501.

Note that, in the present disclosure, for the sake of simplification, the horizontal direction 501 defines a virtual plane that passes through an exit pupil of the optical system 122 and is horizontal to the ground, but the directional definition is not limited thereto. In addition, the optical axis direction 403 of the optical system 122 defines a virtual plane that passes through the optical axis 401 and has an intersecting line with the horizontal direction 501 parallel to the imaging plane 301.

In the example illustrated in FIGS. 3 and 4, the offset is 15 degrees, for example. The depression angle is 3 degrees, for example. The size of the offset and the depression angle are not limited thereto, and can be set to any value.

The optical system 122 forms an image of light from a field at a position on the imaging plane 301 according to an angle of the optical system 122 with respect to the optical axis 401. FIG. 3 illustrates concentric circles 400 each connecting image forming positions on the imaging plane 301 according to the angles of every 10 degrees from the incident position of the optical axis 401 of the optical system 122 on the imaging plane 301, that is, from the center of the optical axis. In the example of FIG. 3, light from the field is allowed to enter the imaging plane 301 within an angular range DU (FIG. 4) between the horizontal direction 501 and a direction away from the horizontal direction 501 upward by approximately 20 degrees. Additionally, light from the field is allowed to enter the imaging plane 301 within an angular range DL (FIG. 4) between the optical axis 401 and a direction away from the optical axis 401 downward below the horizontal direction 501 by approximately 90 degrees.

Moreover, in the example illustrated in FIG. 3, in the concentric circles 400 each indicating the image forming positions at each angle every 10 degrees from the optical axis 401 on the image forming plane, the larger the angle from the optical axis 401, the smaller the interval between the circles. In other words, the optical system 122 according to the present embodiment is configured such that the angular intervals become smaller as being away from the optical axis 401. In a still other expression, the optical system 122 according to the present embodiment is configured such that, the greater the field angle, the smaller the angular variation on the image forming plane. Here, the wider the interval between the concentric circles 400, the larger the number of pixels per 10 degrees on the imaging plane 301. The spatial frequency can be increased when the pixel density is high. Thus, the wider the interval between the concentric circles 400, the higher the resolution of the field with respect to the field angle. Consequently, in the example illustrated in FIG. 3, the closer to the optical axis 401 of the optical system 122, the higher the resolution of the field, namely, the spatial resolution.

Note that, in the example illustrated in FIG. 3, the imaging plane 301 is assumed to have a size 3840×2160 (8M) [px], for example. In this case, when the optical axis 401 is expressed by 0 degrees, light coming from regions of 0 to 10 degrees out of the field can be imaged by using pixels of 320 [px]. Light coming from a region of 0 to 20 degrees out of the field can be imaged by using pixels of 608 [px]. Light coming from a region of 0 to 30 degrees out of the field can be imaged by using pixels of 835 [px]. Light coming from a region of 0 to 40 degrees out of the field can be imaged by using pixels of 1010 [px]. Light coming from a region of 0 to 50 degrees out of the field can be imaged by using pixels of 1152 [px]. Light coming from a region of 0 to 60 degrees out of the field can be imaged by using pixels of 1265 [px]. Light coming from a region of 0 to 70 degrees out of the field can be imaged by using pixels of 1373 [px]. Light coming from a region of 0 to 80 degrees out of the field can be imaged by using pixels of 1459 [px]. Light coming from a region of 0 to 90 degrees out of the field can be imaged by using pixels of 1535 [px]. In this manner, the larger the angle formed with the optical axis 401, the smaller the number of pixels used for imaging each angular range.

Note that, as illustrated in FIG. 3, the imaging element 121 may have an imaging plane 303 that is smaller in number of pixels than that of the imaging plane 301 described above. Such an imaging plane 303 is assumed to have a size of 2560×1920 (5M) [px], for example. In this manner, the number of pixels of the imaging element 121 can be optionally set to any number. Here, the imaging plane 303 is an example of the first region.

Note that, in the example illustrated in FIG. 3, the region 315 is a region within the imaging element 121, which is used for image data generation for the electronic rear-view mirror 30. Image data of the region 315 captured by the imaging element 121 is converted into image data indicated by a region 305 by the image processing device 20 described below, and is supplied to the electronic rear-view mirror 30. The region 305 is a region corresponding to a field angle of 40 degrees in the horizontal direction. The region 305 has a size of 1206×263 [px], for example. As illustrated in FIG. 3, a region 317 of the imaging element 121 may be used for image data generation for the electronic rear-view mirror 30. In this case, the image data of the region 317 captured by the imaging element 121 is converted into image data indicated by a region 307 by the image processing device 20 described below, and is supplied to the electronic rear-view mirror 30. The region 307 is a region corresponding to a field angle of 60 degrees in the horizontal direction. The region 307 has a size of 1912×400 [px], for example. In this manner, the number of pixels to be used for image data generation by the electronic rear-view mirror 30 of the imaging element 121 can be optionally set to any number. Here, the region 317 is an example of the second region.

In general, the field angle for a rear-view display is larger than the field angle for an electronic rear-view mirror. The image shooting range of the rear-view mirror is in the periphery of the image shooting range of the rear-view display. The imaging apparatus 10 according to the present embodiment is configured such that, the magnification factor of the image in the optical system 122 varies with the angle (field angle) from the optical axis 401, and the optical axis of the optical system 122 is positioned away from the center of the imaging element 121.

With the configuration above, as compared with a configuration in which the optical axis of the optical system 122 is located at the center of the imaging element 121, the imaging apparatus 10 can be shared by the electronic rear-view mirror 30 and the in-vehicle display 40 without impairing the resolution of the image displayed on the electronic rear-view mirror 30. In other words, it is possible to obtain images corresponding to both the field angle for the electronic rear-view mirror 30 and the field angle for the in-vehicle display 40 in addition to improving pixel density related to the field angle for the electronic rear-view mirror 30.

The signal processing circuit 131 performs predetermined image processing, such as gamma correction and distortion correction, on the image data given from the imaging apparatus 10. The interface 133 outputs, to the image processing device 20, the image data that has undergone signal processing in the signal processing circuit 131. The interface 133 may be implemented by circuitry, for example.

The image processing device 20 is a device that processes image data generated by the imaging apparatus 10. For example, the image processing device 20 generates image data to be individually displayed on the electronic rear-view mirror 30 and the in-vehicle display 40. Here, the image for the in-vehicle display 40 generated by the image processing device 20 is an example of a first image. In addition, the image for the electronic rear-view mirror 30 generated by the image processing device 20 is an example of a second image. The image processing device 20 may perform calibration including gamma correction and distortion correction on the image data given from the imaging apparatus 10. The image processing device 20 is, for example, a computer including a central processing unit (CPU), read only memory (ROM), and random access memory (RAM). The image processing device 20 supplies the processed image data to the electronic rear-view mirror 30 and the in-vehicle display 40.

The electronic rear-view mirror 30 and the in-vehicle display 40 each display an image generated by the image processing device 20.

The electronic rear-view mirror 30 includes a display device and a drive circuit. Examples of the display device include a liquid crystal display panel and an organic electro luminescence (EL) display. The drive circuit drives the display device. The electronic rear-view mirror 30 is a display apparatus that serves as a rear-view mirror. The electronic rear-view mirror 30 is disposed in front of the driver's seat and at an upper position of the vehicle on the center in the horizontal direction of the vehicle. The electronic rear-view mirror 30 displays an image (moving image) of a scene behind the vehicle, which has been captured by the imaging apparatus 10. This makes it possible for the driver of the automobile 200 to check conditions behind the vehicle by watching the image displayed on the electronic rear-view mirror 30 while the automobile 200 is traveling or stopped.

The in-vehicle display 40 includes a display device and a drive circuit. The display device is a liquid crystal display panel, an organic EL display, or the like. The drive circuit drives the display device. The in-vehicle display 40 is installed in a dashboard or on a dashboard. The in-vehicle display 40 displays various pieces of information such as a map, route guidance, radio channel selection, and various settings. In addition, the in-vehicle display 40 functions as a parking assistance device. For example, when the automobile 200 moves backward, the in-vehicle display 40 displays an image of a scene behind the vehicle captured by the imaging apparatus 10 (hereinafter, referred to as a "rear-view image"). By confirming the rear-view image (moving image) when the automobile 200 moves backward, the driver can grasp the status behind the vehicle and can safely move the vehicle backward.

Operations of the display system 100 according to the present embodiment will be described.

The display system 100 is installed in the automobile 200. In the display system 100, the imaging apparatus 10 captures an image of a scene behind the vehicle. The image processing device 20 receives image data (moving image) generated by the imaging apparatus 10.

The image processing device 20 generates an image to be displayed on the electronic rear-view mirror 30 and the in-vehicle display 40 by using the image data on which predetermined image processing has been performed after captured by the imaging apparatus 10.

The image processing device 20 performs image processing on a captured image to equalize density of pixels, for example. In other words, the image processing device 20 interpolates pixels in a region with low pixel density. The image processing device 20 performs, for example, distortion correction processing on the captured image so that the image can look natural.

For example, the image processing device 20 cuts out an image of a region corresponding to the rear-view field angle from the captured image and generates a display image for the in-vehicle display 40. Note that the image processing device 20 may generate a display image for the in-vehicle display 40 on the basis of signals obtained from pixels within a predetermined range of the imaging element 121. For example, the image processing device 20 converts the viewpoint of the image of the visual field R2 as necessary such that the image of the visual field R2 corresponding to the field angle for the in-vehicle display 40 becomes an image to be obtained by viewing slightly obliquely downward from directly behind the automobile 200. The image processing device 20 generates a rear-view image by resizing the cut-out image to a size suitable for display on the in-vehicle display 40. The generated rear-view image is transmitted to the in-vehicle display 40. The in-vehicle display 40 receives and displays data of the rear-view image transmitted from the image processing device 20.

For example, the image processing device 20 cuts out an image of a region corresponding to the field angle for the electronic rear-view mirror 30 in the captured image corresponding to the rear-view field angle, and generates a display image for the electronic rear-view mirror 30. Note that the image processing device 20 may generate a display image for the electronic rear-view mirror 30 on the basis of signals obtained from pixels in a predetermined range of the imaging element 121. For example, the image processing device 20 converts the viewpoint of the image of visual field R1 such that the image of the visual field R1 corresponding to the field angle for the electronic rear-view mirror becomes the image to be obtained by looking directly behind the automobile 200 horizontally from the driver's seat. The image processing device 20 generates an image to be displayed on the electronic rear-view mirror 30 by resizing the cut-out image to a size suitable for display on the electronic rear-view mirror 30. The generated image is transmitted to the electronic rear-view mirror 30. The electronic rear-view mirror 30 receives and displays image data for display transmitted from the image processing device 20.

As described above, the display system 100 of the present embodiment enables one imaging apparatus 10, which is provided in a moving body such as the automobile 200, to generate images having different field angles and image resolutions. For example, the display system 100 according to the present embodiment is able to obtain a clear image with high resolution for the electronic rear-view mirror 30 and a wide-angle image for the in-vehicle display 40 by using the imaging apparatus 10 shared for generating those images.

Note that the in-vehicle display 40 may also display a video image obtained by compositing video images obtained by multiple cameras each capturing the outside of the vehicle. An example of such a video image obtained by compositing video images of the cameras is an omnidirectional bird's-eye view video image.

The present embodiment presents the electronic rear-view mirror 30 used as a rear-view mirror as an example, whereas the present disclosure is not limited thereto. The technology according to the present disclosure can be applied not only to the electronic rear-view mirror 30 but also to, for example, an electronic mirror for use of an outer side-view mirror such as a door mirror or a fender mirror.

In the above-described embodiment, the imaging apparatus 10 capable of obtaining multiple images having different field angles is mounted on a moving body such as the automobile 200. Under such circumstances, the field angle of each image obtained by the imaging apparatus 10 depends on a mounting angle of the imaging apparatus 10 to the moving body such as the automobile 200. On the other hand, when the imaging apparatus 10 is mounted on a moving body such as the automobile 200, there is a demand for mounting the imaging apparatus 10 so as not to be noticeable. In another case, the mounting angle of the imaging apparatus 10 is limited due to wiring arrangement in a moving body such as the automobile 200.

Considering the above, the following will describe a type of the imaging apparatus 10 capable of ensuring a vertical field angle for obtaining a wide-angle image for the in-vehicle display 40 while ensuring a resolution in the horizontal direction for obtaining a clear image with high resolution for the electronic rear-view mirror 30 regardless of the mounting angle.

Figure 5:
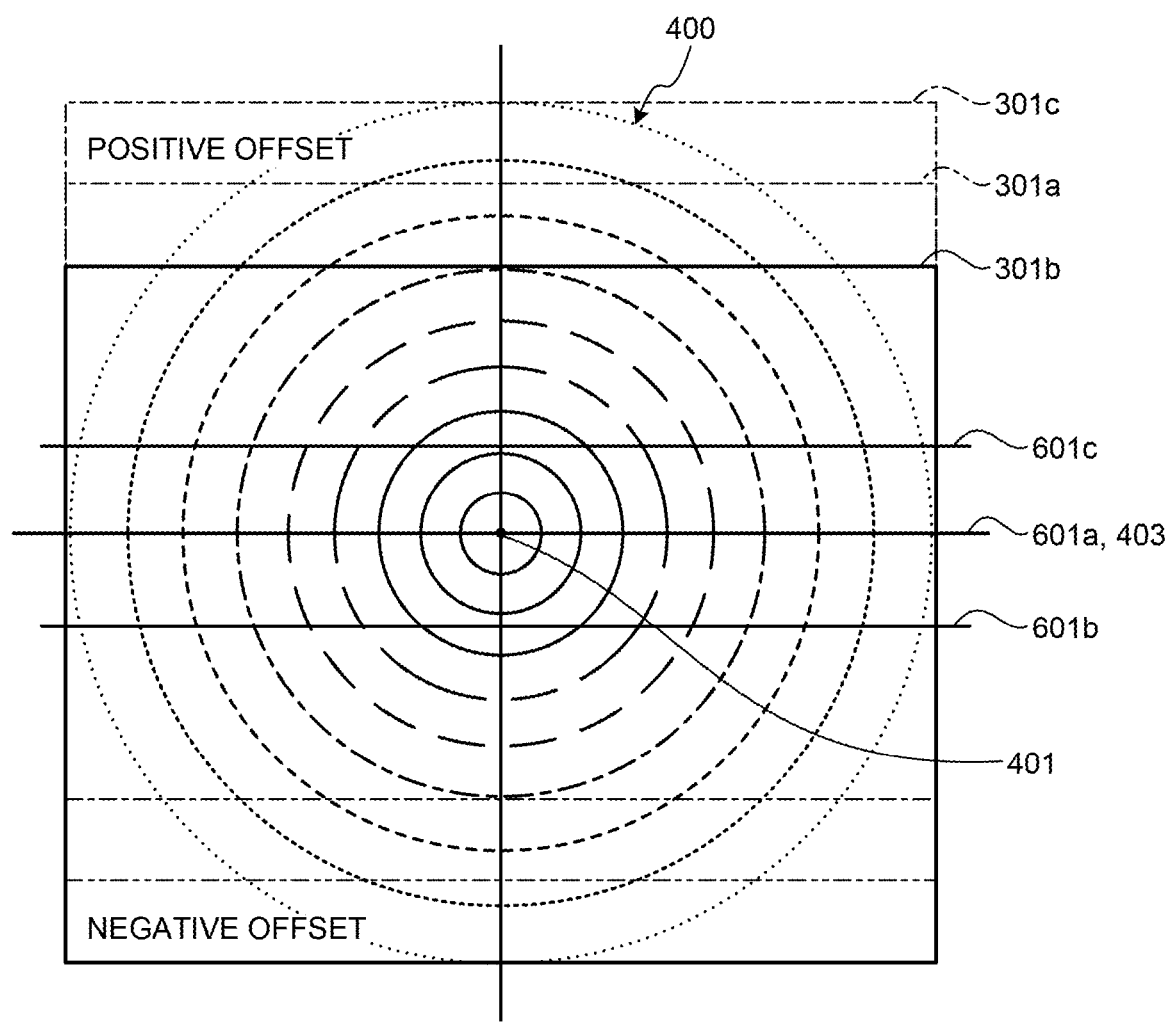
FIG. 5 is a schematic diagram illustrating another example of a relationship between relative positions of an imaging plane of an imaging element and an image forming position on the imaging plane of an optical system in the imaging apparatus in FIG. 1.
Figure 6:
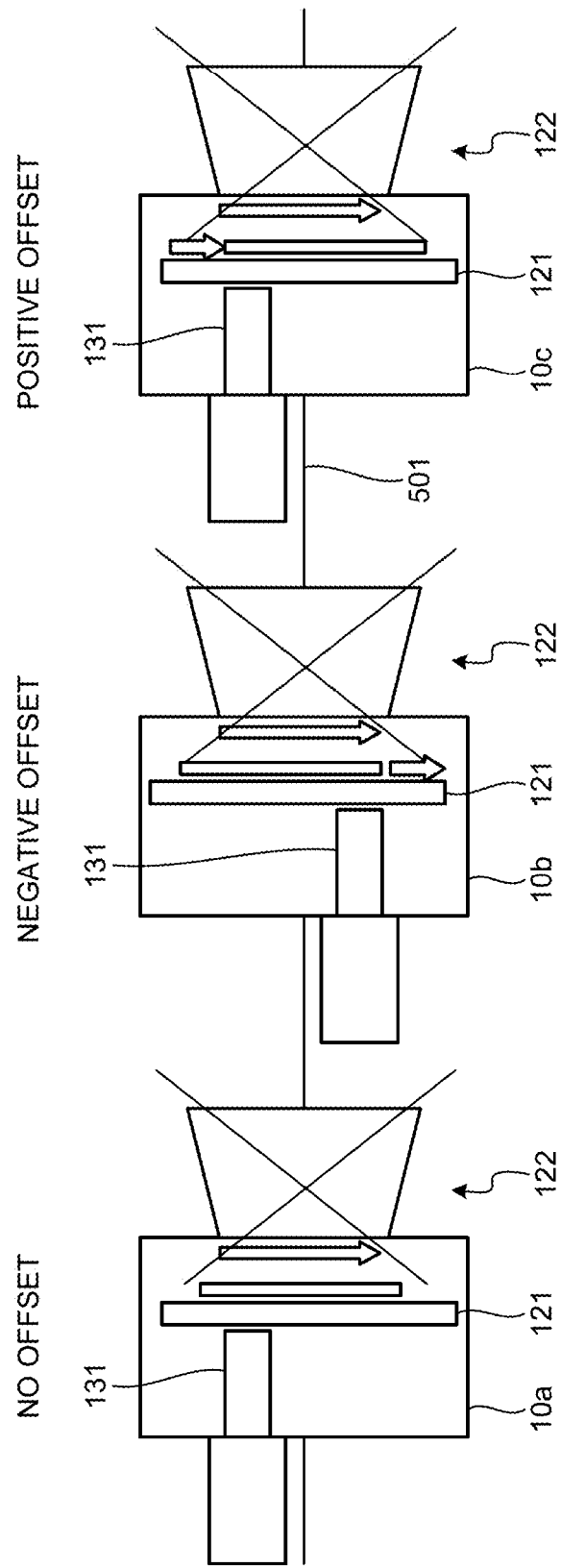
FIG. 6 is a schematic diagram illustrating an example of a configuration of each part in the case of a positive offset and in the case of a negative offset in the imaging apparatus in FIG. 1.

The above-described embodiment illustrated in FIG. 3 is an example of the optical system 122 configured such that, the more distant from the center of the optical axis, the smaller the interval between the concentric circles 400 indicating the image forming positions on the image forming plane corresponding to each predetermined angle (for example, 10 degrees). However, the configuration of the optical system 122 is not limited thereto. The optical system 122 may be configured such that the more distant from the center of the optical axis, the larger the interval between the concentric circles 400. In other words, the optical system 122 may be configured such that the angular intervals become smaller as being away from the optical axis 401. In this case, the optical system 122 can also be expressed such that the larger the field angle, the larger the angular variation on the image forming plane. FIG. 5 is a schematic diagram illustrating another example of a relationship between the relative positions of the imaging plane 301 of the imaging element 121 and an image forming position on the imaging plane 301 of the optical system 122 in the imaging apparatus 10 in FIG. 1. FIG. 5 illustrates a case of a positive offset and a case of a negative offset. FIG. 6 is a schematic diagram illustrating an example of a configuration of each part in the case of a positive offset and in the case of a negative offset in the imaging apparatus 10 in FIG. 1. FIGS. 5 and 6 each further illustrate a case with no offset as a comparative example.

An imaging plane 301a indicates the imaging plane 301 in the case with no offset. In this case, as illustrated in FIG. 5, the optical axis direction 403 of the optical system 122 is aligned with a center 601a of the imaging plane 301a.

An imaging plane 301b indicates the imaging plane 301 in the case with a negative offset. In this case, as illustrated in FIG. 5, a center 601b of the imaging plane 301b is located below the optical axis direction 403 of the optical system 122. With this configuration, the pixel density related to the field angle for the electronic rear-view mirror 30 located in the peripheral portion of the imaging plane 301 can be improved as compared with the case with no offset.

An imaging plane 301c indicates the imaging plane 301 in the case with a positive offset. In this case, as illustrated in FIG. 5, a center 601c of the imaging plane 301c is located above the optical axis direction 403 of the optical system 122. With this configuration, the pixel density related to the field angle for the electronic rear-view mirror 30 located in the peripheral portion of imaging plane 301 can be improved as compared with the case with no offset, or similarly to the case with a negative offset. Naturally, the imaging apparatus 10 according to the above-described embodiment can be configured with a positive offset.

Figure 7:
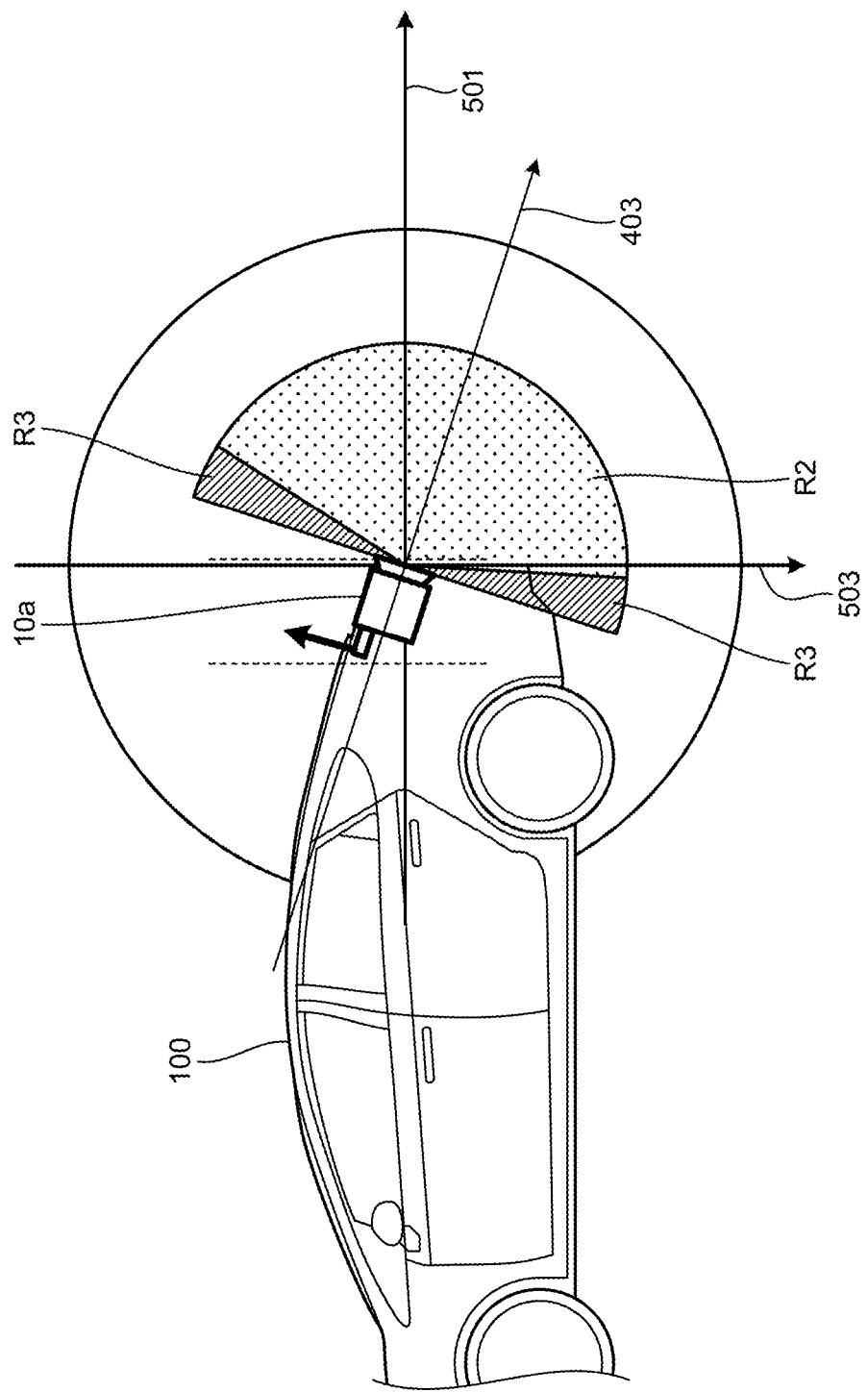
FIG. 7 is a diagram illustrating an example of a field angle in a vertical direction in a case where an imaging apparatus with no offset is mounted on an automobile.
Figure 8:
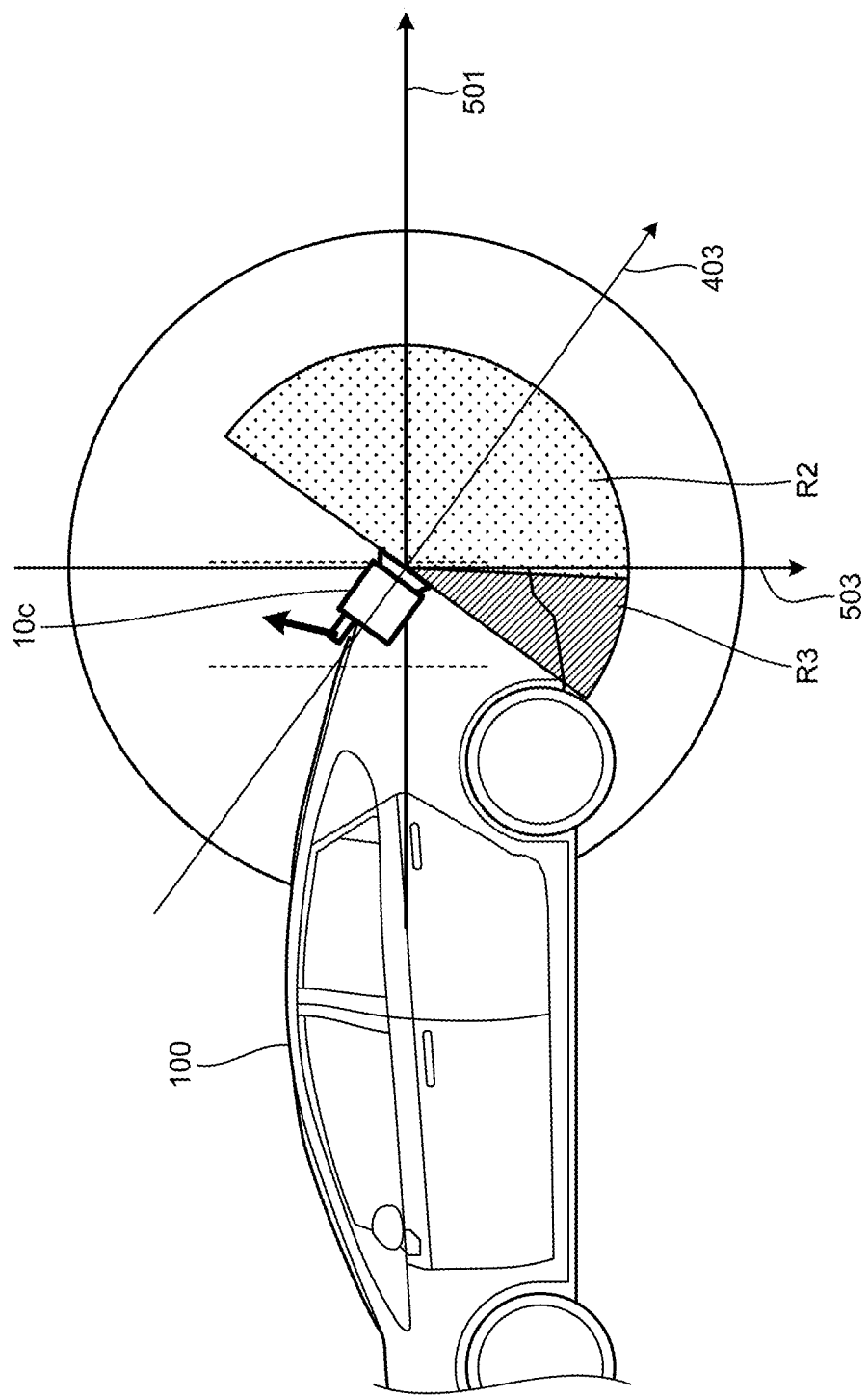
FIG. 8 is a diagram illustrating an example of a field angle in a vertical direction in a case where an imaging apparatus with a positive offset is mounted on an automobile.
Figure 9:
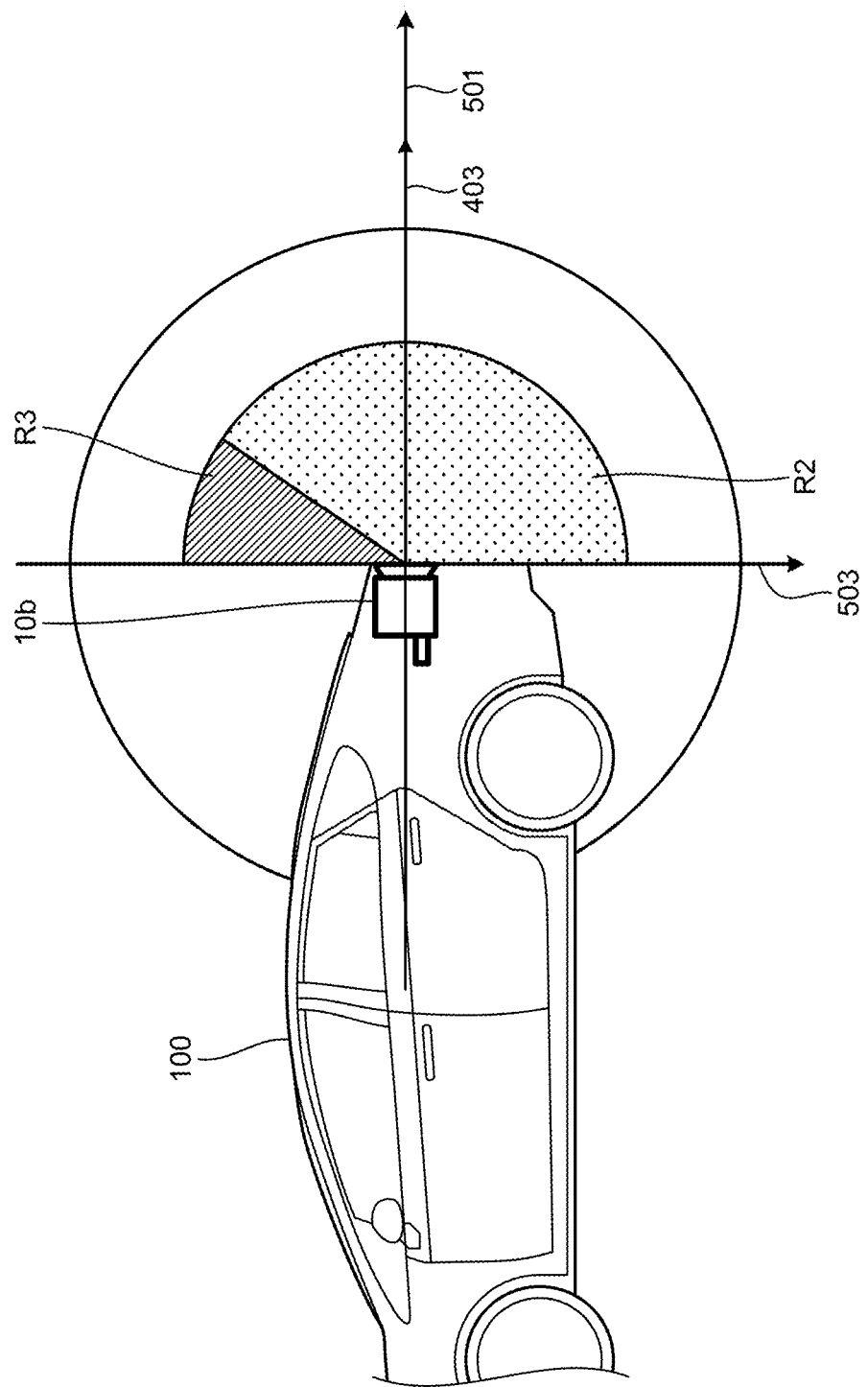
FIG. 9 is a diagram illustrating an example of a field angle in a vertical direction in a case where an imaging apparatus with a negative offset is mounted on an automobile.

The selection between the positive offset and the negative offset can be appropriately performed on the basis of the mounting position and the mounting angle to a moving body such as the automobile 200, wiring arrangement, and the like. FIG. 7 is a diagram illustrating an example of a field angle in the vertical direction in a case where an imaging apparatus 10a with no offset is mounted on the automobile 200. FIG. 8 is a diagram illustrating an example of a field angle in a vertical direction in a case where an imaging apparatus 10c with a positive offset is mounted on the automobile 200. FIG. 9 is a diagram illustrating an example of a field angle in a vertical direction in a case where an imaging apparatus 10b with a negative offset is mounted on the automobile 200.

As illustrated in FIG. 8, in the case with the positive offset, the visual field R2 is located on the upper side in the optical axis direction 403, making it possible to mount the imaging apparatus 10c onto the automobile 200 at a large depression angle as compared with the case with no offset in FIG. 7. This makes it possible to mount the imaging apparatus 10c on the automobile 200 so as not to be noticeable. In addition, by increasing the depression angle, it is possible to take out the wiring between the imaging apparatus 10c and the image processing device 20 further upward as compared with the case with no offset, leading to reduction of the space required for arranging the imaging apparatus 10c.

On the other hand, as illustrated in FIG. 9, in the case with the negative offset, the visual field R2 is located on the lower side in the optical axis direction 403, making it possible to mount the imaging apparatus 10b onto the automobile 200 at a depression angle close to the horizontal direction 501 as compared with the case with no offset in FIG. 7. This makes it possible to mount the imaging apparatus 10b in the formed of being embedded in the body of the automobile 200.

Figure 10:
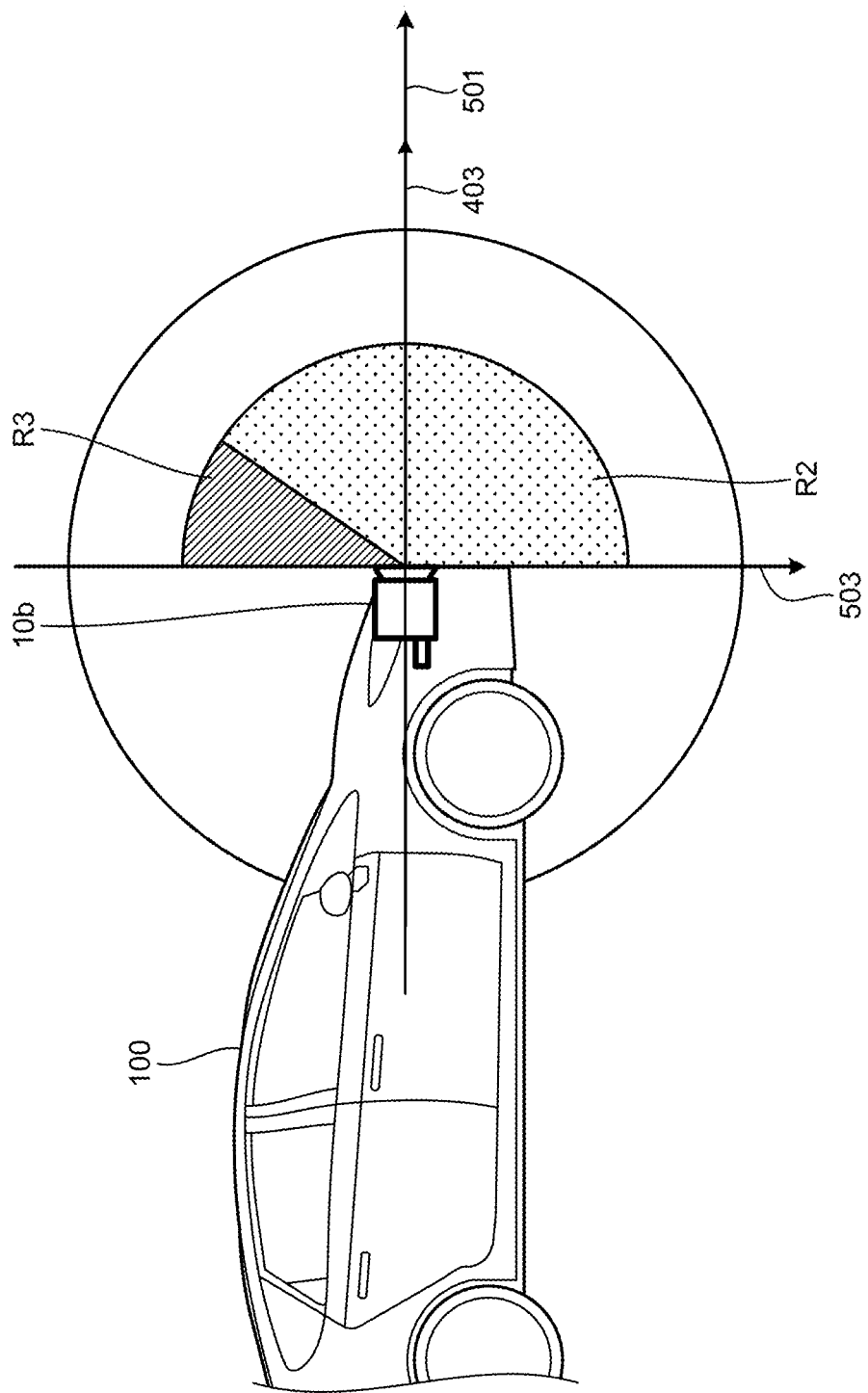
FIG. 10 is a diagram illustrating an example of a field angle in a vertical direction in a case where an imaging apparatus with a negative offset is mounted on a front of an automobile.

While the above embodiment is an example of the electronic rear-view mirror 30 for rear confirmation and the in-vehicle display 40 displaying a rear-view image, the present disclosure is not limited thereto. As illustrated in FIG. 10, the technology according to the present disclosure can also be applied to an in-vehicle display 40 that displays a scene image of a view in front of the vehicle (hereinafter referred to as a "front-view image") and an electronic mirror for confirming a certain visual field portion in a visual field corresponding to the front-view image. Alternatively, the present technology can be applied to a sensor for detecting an obstacle in a certain visual field portion in the visual field corresponding to the front-view image. FIG. 10 is a diagram illustrating an example of a field angle in a vertical direction in a case where the imaging apparatus 10b with a negative offset is mounted on a front of the automobile 200. As illustrated in FIG. 10, in the case with a negative offset, even when the imaging apparatus 10 is disposed on a front bumper of the automobile 200 or the like, it is possible to mount the imaging apparatus 10b in the form of being embedded in the body of the automobile 200 at a depression angle close to the horizontal direction 501 as compared with the case with no offset. In this case, regarding the front of the automobile 200, the imaging apparatus 10b can also capture an image immediately below the automobile 200.

Figure 11:
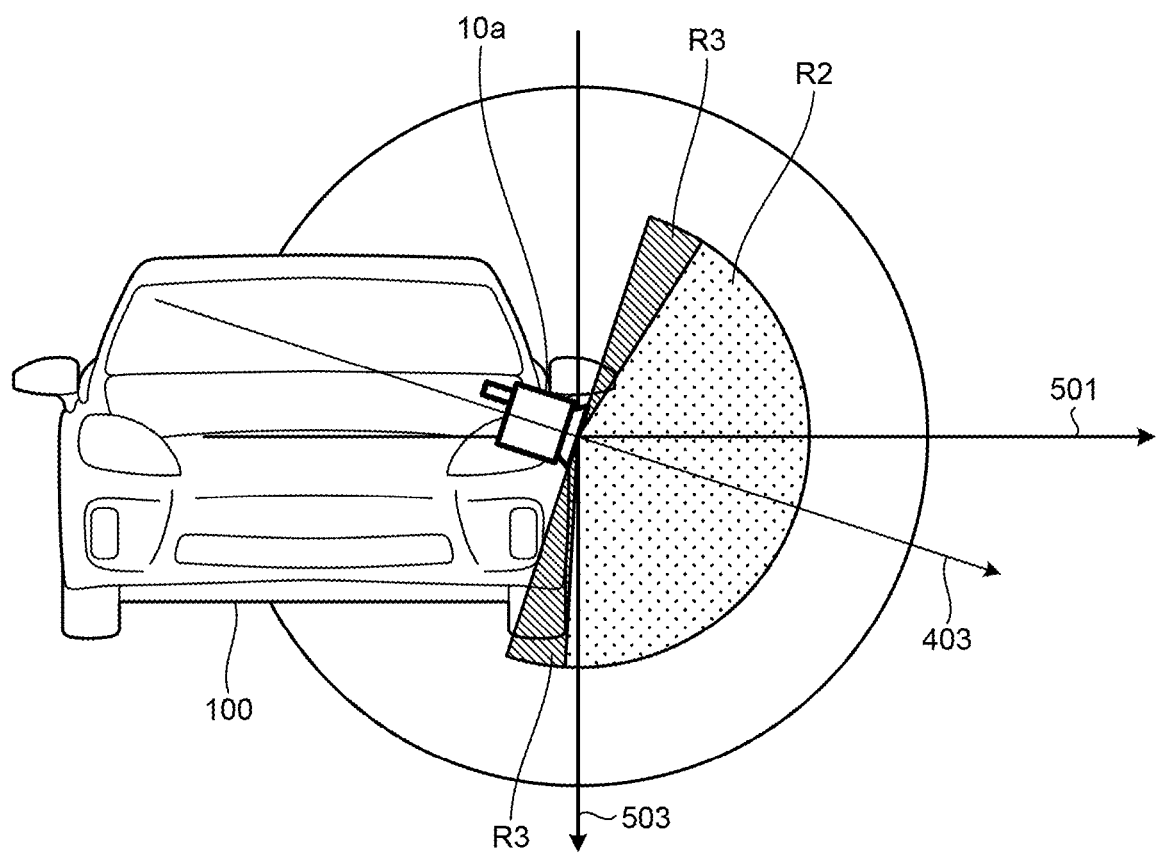
FIG. 11 is a diagram illustrating an example of a field angle in a vertical direction in a case where an imaging apparatus with no offset is mounted on a side of an automobile.
Figure 12:
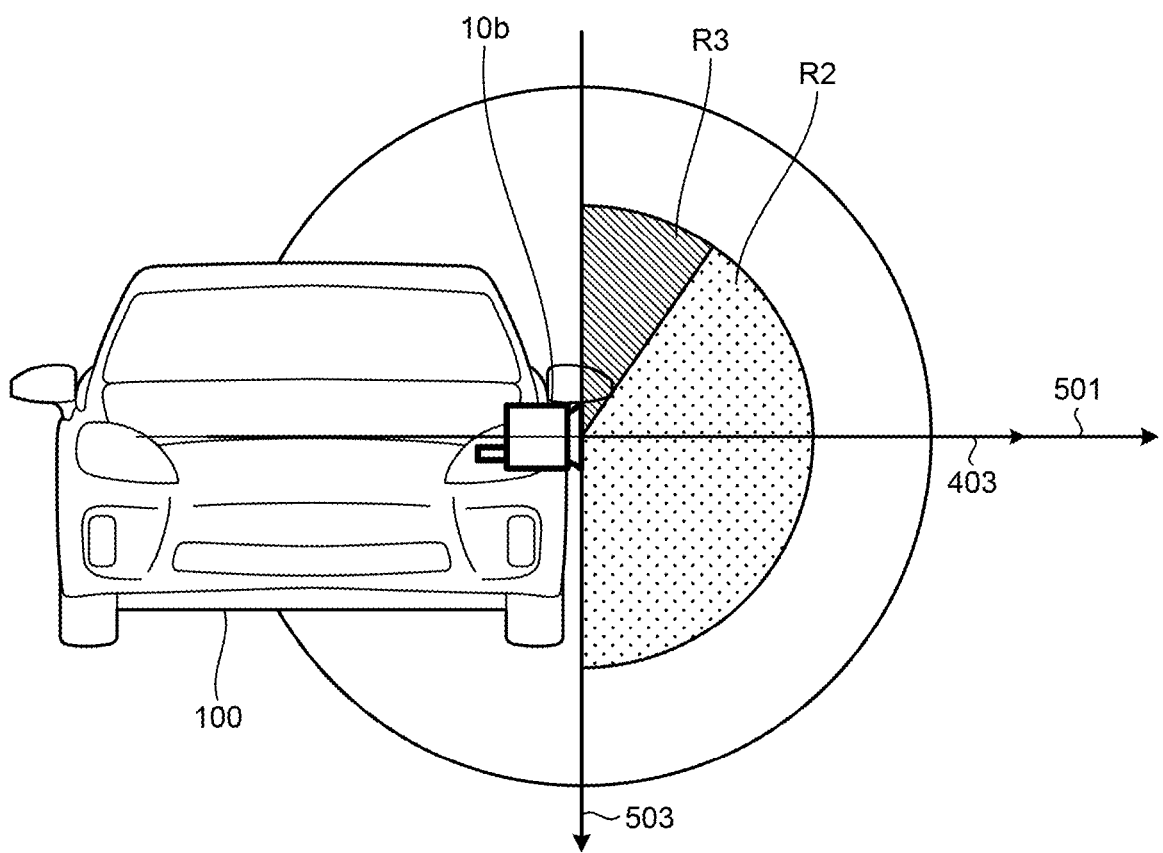
FIG. 12 is a diagram illustrating an example of a field angle in a vertical direction in a case where an imaging apparatus with a negative offset is mounted on a side of an automobile.
Figure 13:
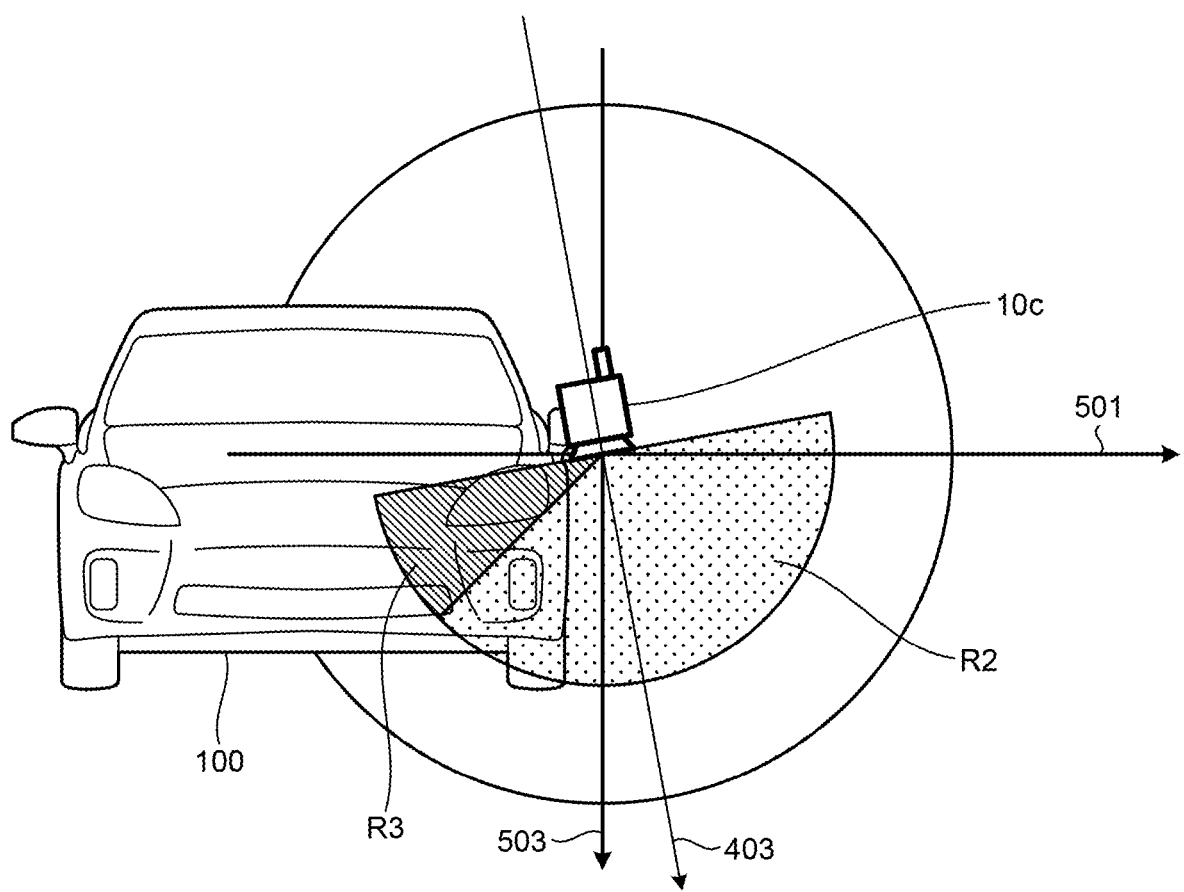
FIG. 13 is a diagram illustrating an example of a field angle in a vertical direction in a case where an imaging apparatus with a positive offset is mounted on a side of an automobile.

Moreover, the technology according to the present disclosure can also be applied to an in-vehicle display 40 that displays a scene image of a view on the side of the vehicle (hereinafter referred to as a "side-view image") and an electronic mirror for confirming an arbitrary visual field portion in a visual field corresponding to the side-view image. FIG. 11 is a diagram illustrating an example of a field angle in the vertical direction in a case where the imaging apparatus 10a with no offset is mounted on the side of the automobile 200. FIG. 12 is a diagram illustrating an example of a field angle in a vertical direction in a case where the imaging apparatus 10b with a negative offset is mounted on the side of the automobile 200. FIG. 13 is a diagram illustrating an example of a field angle in a vertical direction in a case where the imaging apparatus 10c with a positive offset is mounted on the side of an automobile 200.

As illustrated in FIG. 12, in the case of the imaging apparatus 10b with a negative offset, the visual field R2 is located on the lower side in the optical axis direction 403, making it possible to mount the imaging apparatus 10b onto the automobile 200 at a depression angle close to the horizontal direction 501 as compared with the case with no offset in FIG. 11. For example, on the side of the automobile 200, it is possible to mount the imaging apparatus 10b in the form of being embedded in the body of the automobile 200. With this configuration, regarding the side of the automobile 200, it is also possible to capture an image immediately below the automobile 200.

On the other hand, as illustrated in FIG. 13, in the case with a positive offset, the visual field R2 is located on the side in the optical axis direction 403, making it possible to perform mounting on the mirror of the automobile 200 downward at an angle of 80 degrees, for example. With this configuration, regarding the side of the automobile 200, it is possible to capture an image immediately below the automobile 200 and to capture an image upward from the horizontal direction 501. In a case where the horizontal direction 501 or the mirror region of the automobile 200 is located away from the optical axis in the peripheral portion of the optical system 122, it is possible to use the optical system 122 configured such that angular intervals become larger as being away from the optical axis as illustrated in FIG. 5, leading to improvement of pixel density in the peripheral portion of the imaging element 121, which is a portion to be used for generating the image for the mirror.

Figure 14:
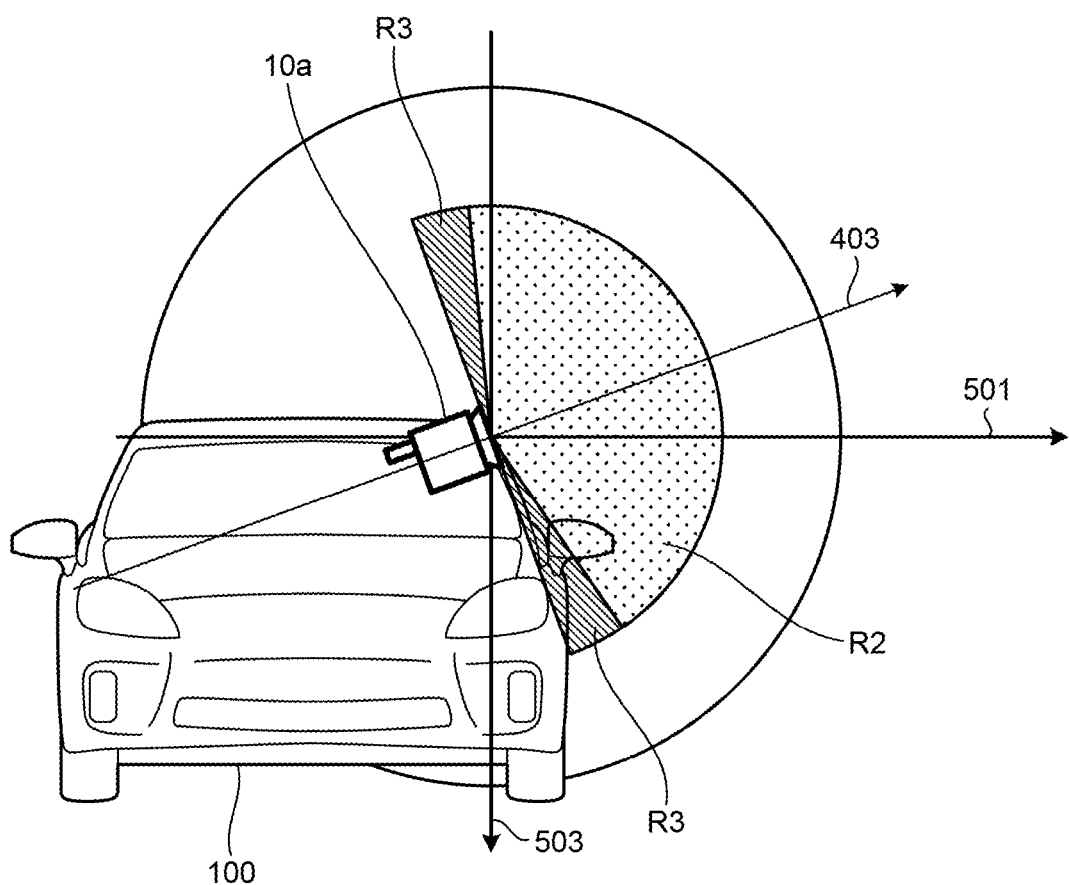
FIG. 14 is a diagram illustrating an example of a field angle in a vertical direction in a case where an imaging apparatus with no offset is mounted on a side pillar of an automobile.
Figure 15:
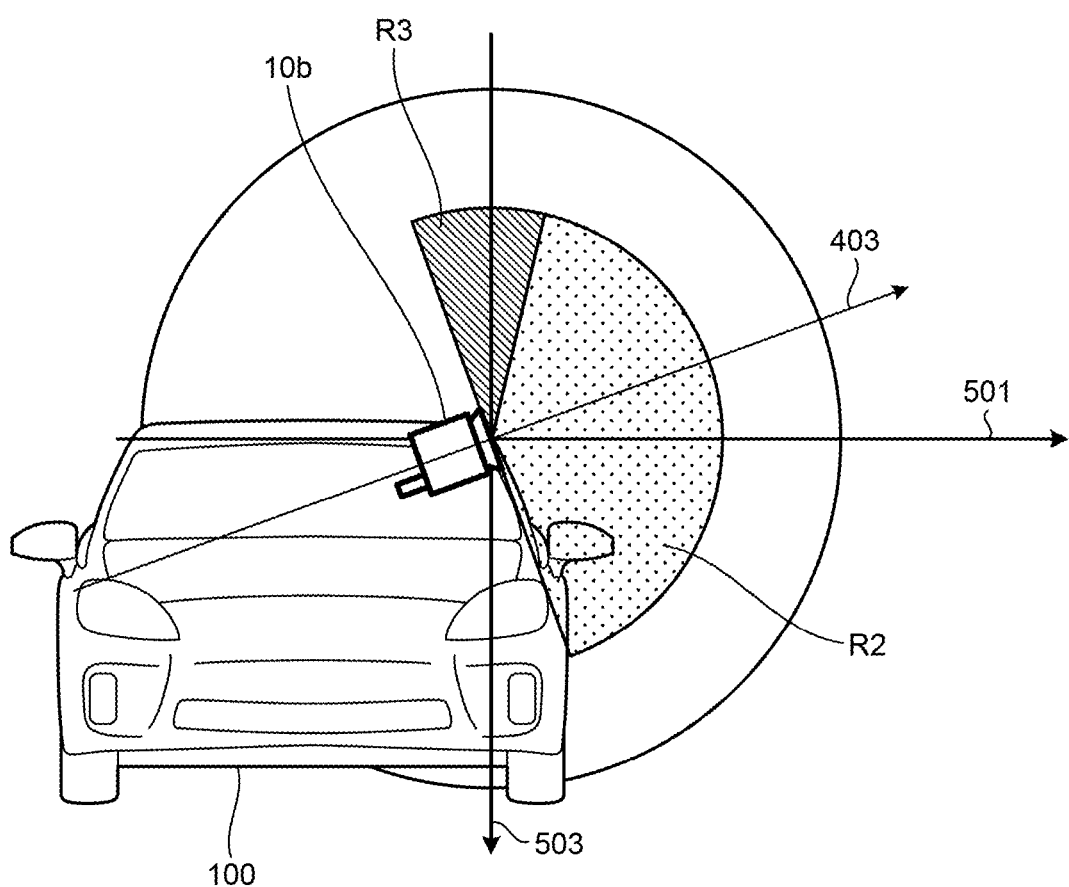
FIG. 15 is a diagram illustrating an example of a field angle in a vertical direction in a case where an imaging apparatus with a negative offset is mounted on a side pillar of an automobile.

Note that the imaging apparatus 10 according to the present disclosure can also be embedded in a pillar of the automobile 200. FIG. 14 is a diagram illustrating an example of a field angle in a vertical direction in a case where the imaging apparatus 10a with no offset is mounted on a side pillar of the automobile 200. FIG. 14 illustrates a case where the imaging apparatus 10a with no offset is arranged in an A-pillar of the automobile 200 at a depression angle of −20 degrees, that is, an elevation angle of 20 degrees. FIG. 15 is a diagram illustrating an example of a field angle in a vertical direction in a case where the imaging apparatus 10b with a negative offset is mounted on a side pillar of the automobile 200. FIG. 15 illustrates a case where the imaging apparatus 10b with a negative offset is arranged in the A-pillar of the automobile 200 at a depression angle of −20 degrees, that is, an elevation angle of 20 degrees. As illustrated in FIG. 14, in the case with no offset, the visual field R2 is apart from the vehicle with respect to the lower side of the automobile 200. In contrast, as illustrated in FIG. 15, in the case with a negative offset, the visual field R2 is located on the lower side of the optical axis direction 403, making it possible to capture an image in the vicinity of the vehicle regarding the lower side of the automobile 200.

As described above, according to the imaging apparatus, the imaging system, and the display system of the present disclosure, it is possible to obtain multiple images having different field angles in the imaging apparatus 10 mounted on a moving body such as the automobile 200.

According to the present disclosure, it is possible to obtain multiple images having different field angles in an imaging apparatus mounted on a moving body. Note that the effects described herein are not necessarily limited, and may be any of the effects described in the present description.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An imaging apparatus comprising: an imaging element on which a plurality of pixels is arranged in a two-dimensional manner, the imaging element being configured to generate image data on the basis of output of the plurality of pixels;
an optical system configured to form, on an imaging plane of the imaging element, an image of light from a field at a magnification factor varying with a field angle; and
an image processing device configured to generate images on the basis of the image data, wherein a shape of the imaging plane is a quadrilateral,
the image processing device is configured to:
generate a first image on the basis of a first region of the imaging plane, the first region corresponding to a first field angle, and generate a second image on the basis of a second region of the imaging plane, the second region corresponding to a second field angle that is a peripheral portion of the first field angle,
an optical axis of the optical system on the imaging plane is positioned a predetermined distance away from a center of the imaging plane in a first direction and is located within the second region,
the optical system is configured such that angular intervals become smaller as a first distance from the optical axis increases in the first direction, and
the optical system is configured such that angular intervals become smaller as a second distance from the optical axis increases in a second direction.

2. The imaging apparatus according to claim 1, wherein the first region is the imaging plane.

3. The imaging apparatus according to claim 1, wherein the optical axis is located at center of the second region in the second direction.

4. The imaging apparatus according to claim 3, wherein the optical axis is located at center of the second region in the first direction.

5. The imaging apparatus according to claim 1, wherein the quadrilateral is a rectangle.

6. A vehicular imaging apparatus comprising:
an imaging element on which a plurality of pixels is arranged in a two-dimensional manner, the imaging element being configured to generate image data on the basis of output of the plurality of pixels on board;
an optical system configured to form, on an imaging plane of the imaging element, an image of light from a field at a magnification factor varying with a field angle; and
an image processing device configured to generate images on the basis of the image data, wherein a shape of the imaging plane is a quadrilateral,
the image processing device is configured to
generate a first image on the basis of a first region of the imaging plane, the first region corresponding to a first field angle, and
generate a second image on the basis of a second region of the imaging plane, the second region corresponding to a second field angle being a peripheral portion of the first field angle,
an optical axis of the optical system on the imaging plane is positioned a predetermined distance away from a center of the imaging plane in a first direction and is located within the second region,
the optical system is configured such that angular intervals become smaller as a first distance from the optical axis increases in the first direction, and the optical system is configured such that angular intervals become smaller as a second distance from the optical axis increases in a second direction.

7. The imaging apparatus according to claim 6, wherein the first region is the imaging plane.

8. The imaging apparatus according to claim 6, wherein the optical axis is located at center of the second region in the second direction.

9. The imaging apparatus according to claim 8, wherein the optical axis is located at center of the second region in the first direction.

10. The imaging apparatus according to claim 6, wherein the quadrilateral is a rectangle.

\* \* \* \* \*